United States Patent [19]

Tanase et al.

[11] Patent Number: 5,777,666
[45] Date of Patent: Jul. 7, 1998

[54] METHOD OF CONVERTING TWO-DIMENSIONAL IMAGES INTO THREE-DIMENSIONAL IMAGES

[75] Inventors: Susumu Tanase, Hirakata; Toshiyuki Okino, Kadoma; Toshiya Iinuma, Moriguchi; Syugo Yamashita, Kadoma; Hidekazu Uchida, Hirakata; Yukio Mori; Akihiro Maenaka, both of Kadoma; Seiji Okada, Moriguchi; Kanzi Ihara, Higashiosaka, all of Japan

[73] Assignee: Sanyo Electric Co., Ltd., Osaka, Japan

[21] Appl. No.: 633,036

[22] Filed: Apr. 16, 1996

[30] Foreign Application Priority Data

| Apr. 17, 1995 | [JP] | Japan | 7-091022 |
| Jul. 24, 1995 | [JP] | Japan | 7-187314 |
| Mar. 22, 1996 | [JP] | Japan | 8-066054 |

[51] Int. Cl.$^6$ ................................... H04N 13/00
[52] U.S. Cl. ................................... 348/43; 348/44
[58] Field of Search ................................. 348/43, 42, 46, 348/51, 45, 44, 699; H04N 13/00, 15/00

[56] References Cited

U.S. PATENT DOCUMENTS

| 4,935,810 | 6/1990 | Nonami et al. | 348/45 |
| 5,432,543 | 7/1995 | Hasegawa et al. | 348/45 |
| 5,510,832 | 4/1996 | Garcia | 348/51 |
| 5,612,735 | 3/1997 | Haskell et al. | 348/43 |

*Primary Examiner*—Tommy P. Chin
*Assistant Examiner*—Y. Lee
*Attorney, Agent, or Firm*—Nikaido, Marmelstein, Murray & Oram LLP

[57] ABSTRACT

In the present invention, two-dimensional images are converted into three-dimensional images by producing from a two-dimensional image signal a main image signal and a sub-image signal delayed from the main image signal. A field delay indicating how many fields are there from a field corresponding to the main image signal to a field corresponding to the sub-image signal is changed depending on the speed of the horizontal movement of the main image signal. The upper limit of the field delay is determined on the basis of vertical components of motion vectors detected from the main image signal. The field delay is so determined that it is not more than the determined upper limit.

5 Claims, 11 Drawing Sheets

FIG. 6

| d2-1 | d2-2 | d2-3 | Pd |
|---|---|---|---|
| 3 | 3 | 5 | 3 |
| 3 | 5 | 5 | 3 |
| 5 | 5 | 5 | 5 |
| ⋮ | ⋮ | ⋮ | ⋮ |

FIG. 7

| d2-1 | d2-2 | d2-3 | Pd |
|---|---|---|---|
| 3 | 3 | 4 | 3 |
| 3 | 4 | 5 | 3 |
| 4 | 5 | 6 | 3→4 |
| ⋮ | ⋮ | ⋮ | ⋮ |

METHOD OF CONVERTING TWO-DIMENSIONAL IMAGES INTO THREE-DIMENSIONAL IMAGES

BACKGROUND OF THE INVENTION

1. Field of the Invention

The present invention relates to a method of converting two-dimensional (2D) images outputted from a VCR (Video Cassette Recorder), a video camera or the like and transmitted by CATV (Cable Television) broadcasting, TV broadcasting or the like into three-dimensional (3D) images.

2. Description of the Prior Art

Almost all types of 3D image software used for a 3D image display system which has been recently in the news are particularly produced for the 3D image display system. The 3D image software is generally recorded by picking up a left eye image and a right eye image using two cameras. The left eye image and the right eye image which are recorded on the 3D image software are displayed with they being overlapped with each other on a display device almost simultaneously. The left eye image and the right eye image which are displayed with they being overlapped with each other are separately incident on the left eye and the right eye of a viewer, respectively, whereby the viewer recognizes 3D images.

A lot of types of 2D image software currently exist. If a 3D image can be produced from the 2D image software, therefore, time and labor required to produce 3D image software having the same content as that of the existing 2D image software again from the beginning are saved.

As a result, a method of converting 2D images into 3D images has already been proposed. Examples of the conventional method of converting 2D images into 3D images include the following. Specifically, in the case of a 2D image on which an object moving from the left to the right is reflected, the original 2D image is taken as a left eye image, and an image corresponding to a field which is several fields preceding a field corresponding to the left eye image is taken as a right eye image. Consequently, binocular parallax occurs between the left eye image and the right eye image. By displaying both the images on a screen almost simultaneously, therefore, the moving object is raised forward against the background.

The image corresponding to the field which is several fields preceding the field corresponding to the left eye image is obtained by storing the original 2D image in a field memory, delaying the image by a predetermined number of fields and reading out the image. The above-mentioned conventional method shall be referred to as a field delay system.

In the conventional method, when the number of fields from the field corresponding to one of the left eye image and the right eye image to the field corresponding to the other image (hereinafter referred to as a field delay) is made constant, the faster the horizontal movement of the moving object is, the larger the parallax becomes. Therefore, a 3D effect is changed so that a 3D image is difficult to see.

Therefore, the applicant of the present invention has conceived that the faster the horizontal movement of a moving object becomes, the smaller a field delay from one of a left eye image and a right eye image to the other image is made in order to obtain a stable 3D effect. Consequently, a relatively new field is presented as a delayed image with respect to an image whose horizontal movement is fast, and a relatively old field is presented as a delayed image with respect to an image whose horizontal movement is slow.

In the above-mentioned method of determining a field delay, a field delay is determined on the basis of only the speed of the horizontal movement of an image. Even when an object greatly moving vertically exists, therefore, the field delay is increased if the horizontal movement of the image is small. In such a case, the vertical distance of the object greatly moving vertically is increased between a left eye image and a right eye image, whereby the left eye image and the right eye image of the object greatly moving vertically are not harmonized with each other.

In a case where a repeatedly moving object, for example, the hands and legs of a running person is locally included in an image, an average value of motion vectors is decreased, whereby a field delay is increased. In such a case, images in different positions of the repeatedly moving object respectively become a left eye image and a right eye image, whereby the repeatedly moving object appears as a double image, which becomes a very ugly image.

SUMMARY OF THE INVENTION

An object of the present invention is to provide a method of converting 2D images into 3D images in which it is possible to avoid the possibility that a left eye image and a right eye image of an object vertically moving are not harmonized with each other.

Another object of the present invention is to provide a method of converting 2D images into 3D images in which a repeatedly moving object can be prevented from appearing as a double image even when it is locally included in an image.

In a first method of converting 2D images into 3D images according to the present invention, 2D images are converted into 3D images by producing from a 2D image signal a main image signal and a sub-image signal delayed from the main image signal. A field delay indicating how many fields are there from a field corresponding to the main image signal to a field corresponding to the sub-image signal is changed depending on the speed of the horizontal movement of the main image signal. The upper limit of the field delay is determined on the basis of vertical components of motion vectors detected from the main image signal. The field delay is so determined that it is not more than the determined upper limit.

In the first method of converting 2D images into 3D images according to the present invention, it is possible to avoid the possibility that a left eye image and a right eye image of an object vertically moving are not harmonized with each other.

The upper limit of the field delay is determined in the following manner, for example. Specifically, an average value of absolute values of vertical components of all or parts of motion vectors respectively detected from a plurality of motion vector detecting areas set in an image area of the main image signal is calculated for each field and is stored. The upper limit of the field delay is determined for each field within the range of the number of past fields corresponding to average values whose sum is less than a predetermined value.

Examples of a more concrete method of calculating the upper limit of the field delay include the following methods:

(1) First Method

An average value of absolute values of vertical components of all or parts of motion vectors respectively detected from a plurality of motion vector detecting areas set in an image area of the main image signal is calculated for each field and is stored in storing means (a first step).

A variable indicating how many continuous fields correspond to average values including the latest average value which are to be accumulated out of average values corresponding to a predetermined number of past fields which are stored in the storing means is set to a predetermined maximum value of the field delay (a second step).

The average values corresponding to the set variable out of the average values corresponding to the predetermined number of past fields which are stored in the storing means are read out in the order starting from the latest average value, to calculate the sum of the average values (a third step).

The variable currently set is determined as the upper limit of the field delay when the calculated sum is less than a predetermined reference value, and the variable currently set is decremented by one when the calculated sum is not less than the predetermined reference value (a fourth step).

When the variable is updated in the fourth step, the processing in the third and fourth steps is repeatedly performed using the updated variable (a fifth step).

(2) Second Method

An average value of absolute values of vertical components of all or parts of motion vectors respectively detected from areas which are judged to be areas where subjects exist out of a plurality of motion vector detecting areas set in an image area of the main image signal is calculated for each field, and the calculated average value is stored as a first average value in storing means (a first step).

An average value of absolute values of vertical components of all or parts of motion vectors respectively detected from areas which are judged to be areas where backgrounds exist out of the plurality of motion vector detecting areas is calculated for each field, and the calculated average value is stored as a second average value in the storing means (a second step).

A variable indicating how many continuous fields correspond to average values including the latest average value which are to be accumulated out of first average values and second average values corresponding to a predetermined number of past fields which are stored in the storing means is set to a predetermined maximum value of the field delay (a third step).

The first average values corresponding to the set variable out of the first average values corresponding to the predetermined number of past fields which are stored in the storing means are read out in the order starting from the latest first average value, to calculate the first sum which is the sum of the first average values (a fourth step).

Second average values corresponding to the set variable out of the second average values corresponding to the predetermined number of past fields which are stored in the storing means are read out in the order starting from the latest second average value, to calculate the second sum which is the sum of the second average values (a fifth step).

The variable currently set is determined as the upper limit of the field delay when both the first sum and the second sum calculated are less than a predetermined reference value, and the variable currently set is decremented by one when at least one of the first sum and the second sum calculated is not less than the predetermined reference value (a sixth step).

When the variable is updated in the sixth step, the processing in the fourth, fifth and sixth steps is repeatedly performed using the updated variable (a seventh step).

(3) Third Method

Absolute values of vertical components of motion vectors respectively detected from all or parts of a plurality of motion vector detecting areas set in an image area of the main image signal are calculated for each field, and it is judged whether or not the calculated absolute values are more than a predetermined value (a first step).

It is judged that conditions for judging whether or not an object greatly moving vertically exists in the main image signal are satisfied when the calculated absolute values are more than the predetermined value, and the results of the judgment are stored in storing means in relation to the motion vector detecting areas where the motion vectors which are sources of calculation of the absolute values are detected (a second step).

It is judged whether or not there exist motion vector detecting areas satisfying the conditions over not less than a predetermined defined number of fields out of a predetermined number of past fields out of the motion vector detecting areas on the basis of the results of the judgment corresponding to the predetermined number of past fields which are stored in the storing means (a third step).

The upper limit of the field delay is zero when there exist the motion vector detecting areas satisfying the conditions over not less than the predetermined defined number of fields out of the predetermined number of past fields out of the motion vector detecting areas (a fourth step).

In a second method of converting 2D images into 3D images according to the present invention, 2D images are converted into 3D images by producing from a 2D image signal a main image signal and a sub-image signal delayed from the main image signal. A field delay indicating how many fields are there from a field corresponding to the main image signal to a field corresponding to the sub-image signal is changed depending on the speed of the horizontal movement of the main image signal. It is judged whether or not a repeatedly moving object is included in the main image signal on the basis of motion vectors detected from the main image signal (a first step). When it is judged that the repeatedly moving object is included in the main image signal, the field delay is limited (a second step).

In the second method of converting 2D images into 3D images according to the present invention, even when a repeatedly moving object is locally included in an image, the repeatedly moving object is prevented from appearing as a double image.

Examples of a method of judging whether or not the repeatedly moving object is included in the main image signal include the following two methods.

(1) First Method

Motion vectors are respectively detected for each field from all or parts of a plurality of motion vector detecting areas set in an image area of the main image signal, and the detected motion vectors are stored in storing means.

The motion vectors detected in the motion vector detecting areas are accumulated for each motion vector detecting area over a first predetermined number of past fields on the basis of the motion vectors corresponding to a predetermined number of past fields which are stored in the storing means, to calculate the first sum for each motion vector detecting area.

The motion vectors detected in the motion vector detecting areas are accumulated for each motion vector detecting area over a second predetermined number of past fields which is larger than the first predetermined number of past fields on the basis of the motion vectors corresponding to the predetermined number of past fields which are stored in the storing means, to calculate the second sum for each motion vector detecting area.

It is judged whether or not there exists a motion vector detecting area where the product of the first sum and the second sum is less than zero out of the motion vector detecting areas, and it is judged that a repeatedly moving object is included in the main image signal when there exists the motion vector detecting area where the product of the first sum and the second sum is less than zero.

(2) Second Method

Motion vectors are respectively detected for each field from all or parts of a plurality of motion vector detecting areas set in an image area of the main image signal, and the detected motion vectors are stored in storing means.

The motion vectors detected in the motion vector detecting areas are accumulated for each motion vector detecting area over a first predetermined number of past fields on the basis of the motion vectors corresponding to a predetermined number of past fields which are stored in the storing means, to calculate the first sum for each motion vector detecting area.

The motion vectors detected in the motion vector detecting areas are accumulated for each motion vector detecting area over a second predetermined number of past fields, which is larger than the first predetermined number of past fields on the basis of the motion vectors corresponding to the predetermined number of past fields which are stored in the storing means, to calculate the second sum for each motion vector detecting area.

It is judged whether or not there exists a motion vector detecting area where the absolute value of the first sum is more than the absolute value of the second sum out of the motion vector detecting areas, and it is judged that a repeatedly moving object is included in the main image signal when there exists the motion vector detecting area where the absolute value of the first sum is more than the absolute value of the second sum.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a timing chart showing how a target field delay is changed in a case where all three second field delays coincide;

FIG. 7 is a timing chart showing how a target field delay is changed in a case where all three second field delays are larger than the current target field delay;

DETAILED DESCRIPTION OF THE PREFERRED EMBODIMENTS

Description is now made of embodiments of the present invention with reference to the drawings.

Figure 1:
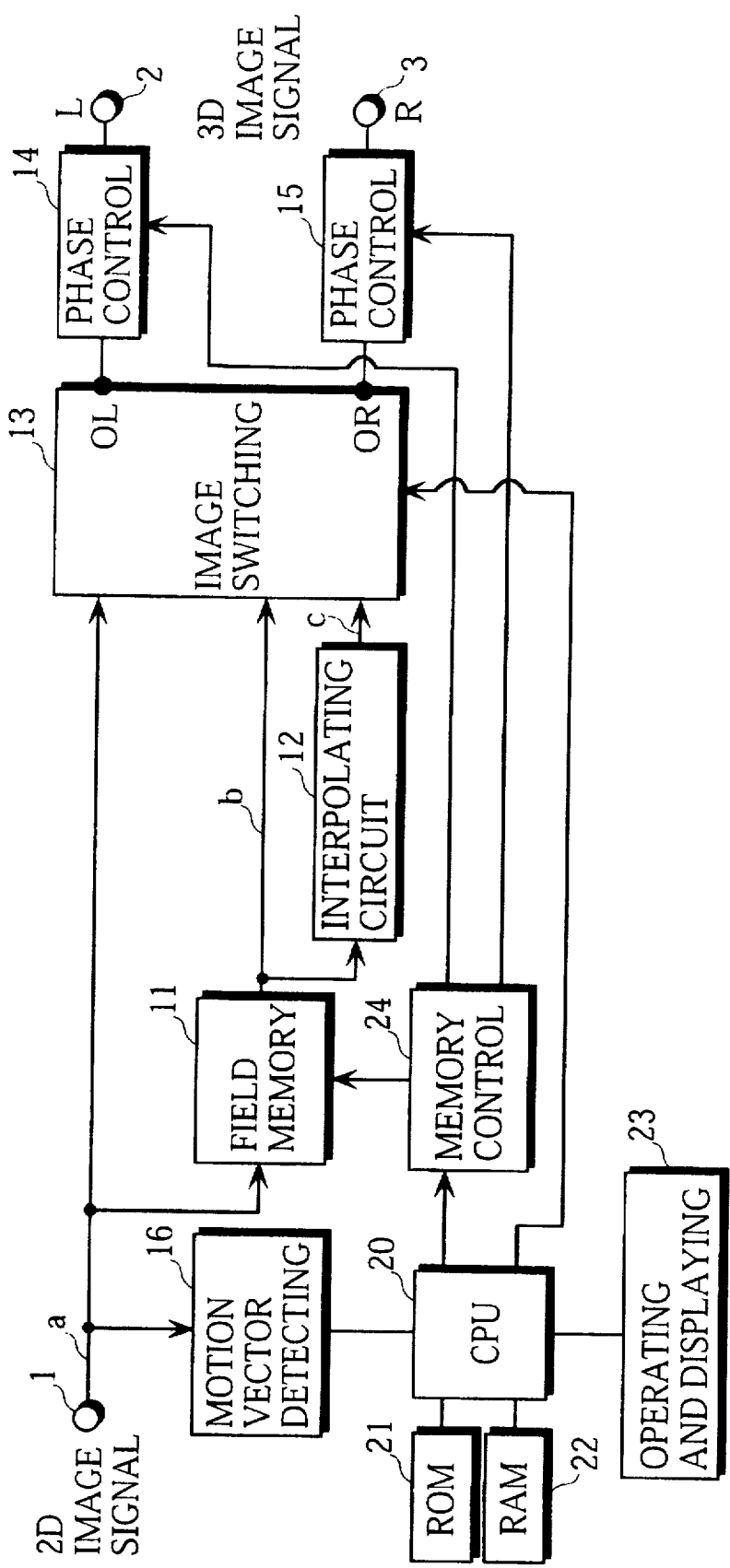
FIG. 1 is a block diagram showing the construction of a 2D/3D converter.

FIG. 1 illustrates the construction of a 2D/3D converter for converting 2D images into 3D images.

The 2D/3D converter produces a left eye image and a right eye image by a field delay system to produce parallax, and subjects both or one of the left eye image and the right eye image produced to phase shift, thereby to change the positional relationship between a subject and the surface of a reference screen.

A 2D image signal a is inputted to an input terminal 1. The 2D image signal a is sent to a motion vector detecting circuit 16, a plurality of field memories 11, and an image switching circuit 13.

As is well known, the motion vector detecting circuit 16 produces data for detecting a motion vector on the basis of a representative point matching method. The data produced by the motion vector detecting circuit 16 is sent to a CPU (Central Processing Unit) 20.

Figure 8:
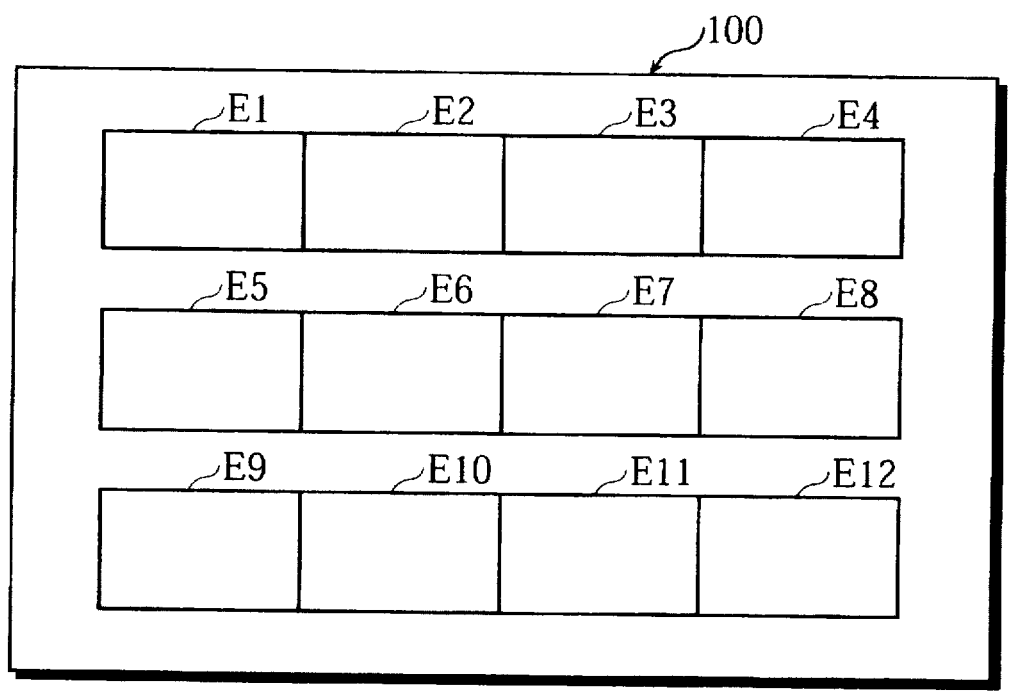
FIG. 8 is a typical diagram showing a plurality of motion vector detecting areas $E_1$ to $E_{12}$ set in an image area of each field.
Figure 9:
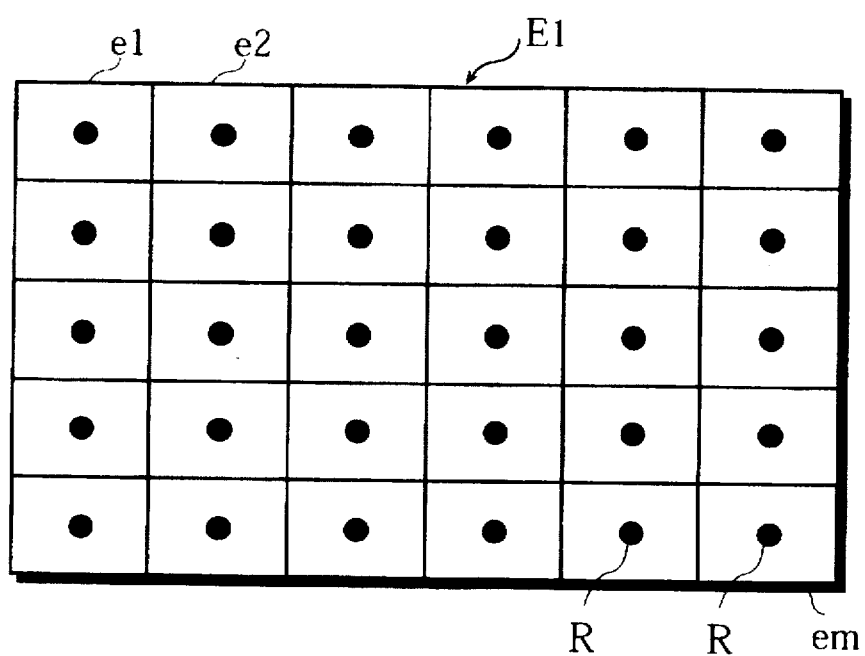
FIG. 9 is a typical diagram showing a plurality of small areas e in the motion vector detecting area.
Figure 10:
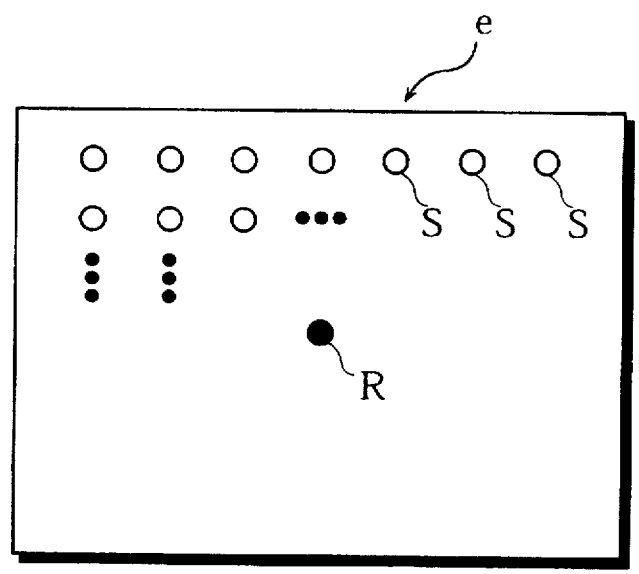
FIG. 10 is a typical diagram showing a plurality of sampling points S and one representative point R set in the small area e.

The representative point matching method will be briefly described. A plurality of motion vector detecting areas $E_1$ to $E_{12}$ are set in an image area 100 of each of fields, as shown in FIG. 8. The motion vector detecting areas $E_1$ to $E_{12}$ are the same in size. Each of the motion vector detecting areas $E_1$ to $E_{12}$ is further divided into a plurality of small areas ($e_1$ to $e_m$), as shown in FIG. 9. A plurality of sampling points and one representative point are set in each of the small areas e, as shown in FIG. 10.

The difference between the level of an image signal at each of the sampling points S in the small area e in the current field and the level of an image signal at a representative point R in a corresponding small area e in the preceding field (a correlation value at each of the sampling points) is found for each motion vector detecting area ($E_1$ to $E_{12}$). Correlation values at the sampling points which are the same in displacement from the representative points R are accumulated for each motion vector detecting area ($E_1$ to $E_{12}$) between the small areas in the motion vector detecting area. Therefore, correlation values whose number corresponds to the number of sampling points in one small area e are found for each motion vector detecting area ($E_1$ to $E_{12}$).

In each of the motion vector detecting areas $E_1$ to $E_{12}$, displacement of a point at which the minimum accumulated correlation value is obtained, that is, displacement of a point at which the correlation characteristics are the highest is extracted as a motion vector in the motion vector detecting area (the movement of a subject).

The field memory 11 is provided to delay the 2D image signal a for each field and output the delayed 2D image signal a. A plurality of field memories 11 are provided. Writing and reading to and from each of the field memories 11 are controlled by a memory control circuit 24.

An output b (a delayed 2D image signal) of the field memory 11 is sent to the image switching circuit 13 and an interpolating circuit 12, respectively. The interpolating circuit 12 generates a vertical interpolation signal with respect to the input signal b. An output c of the interpolating circuit 12 (a vertical interpolation signal of the delayed 2D image signal) is sent to the image switching circuit 13.

Consequently, the inputted 2D image signal a, the delayed 2D image signal A, the vertical interpolation signal c of the delayed 2D image signal b are inputted to the image switching circuit 13. The image switching circuit 13 switches one of the signal k and the signal c (a sub-image signal) and the signal a (a main image signal) depending on the direction of the movement of the subject and outputs the signals to a left image phase control circuit 14 and a right image phase control circuit 15. When a field delay indicating how many fields are there from a field corresponding to the main image signal to a field corresponding to the sub-image signal is zero, the signal a is sent to both the left image phase control circuit 14 and the right image phase control circuit 15.

One of the signal b and the signal c is selected depending on whether the 2D image signal a corresponds to an odd field or an even field. That is, the signal, which corresponds to the type of field (an odd field or an even field) of the 2D image signal a, out of the signal b and the signal c is selected. The switching of the image by the image switching circuit 13 is controlled by the CPU 20.

Each of the phase control circuits 14 and 15 is provided to horizontally move the position where an inputted image is displayed by shifting the phase of the inputted image signal. The amount and the direction of phase shift are controlled by the memory control circuit 24. An output of the left image phase control circuit 14 is sent to a left image output terminal 2. On the other hand, an output of the right image phase control circuit 15 is sent to a right image output terminal 3.

The CPU 20 controls the memory control circuit 24 and the image switching circuit 13. The CPU 20 comprises a ROM (Read-Only Memory) 21 for storing its program and the like and a RAM (Random Access Memory) 22 for storing necessary data. Data required to detect a motion vector is sent to the CPU 20 from the motion vector detecting circuit 16. In addition, an operating and displaying unit 23 comprising various types of inputting means and display devices is connected to the CPU 20.

The CPU 20 calculates a field delay on the basis of a motion vector. In principle, the field delay is so determined that it is smaller when the motion vector is large, while being larger when the motion vector is small.

Furthermore, the CPU 20 controls the image switching circuit 13 on the basis of the direction of the motion vector. Specifically, when the motion vector is directed from the left to the right, the inputted 2D image signal a is sent to the left image phase control circuit 14, and the delayed 2D image signal la or C is sent to the right image phase control circuit 15. When the motion vector is directed from the right to the left, the inputted 2D image signal a is sent to the right image phase control circuit 15, and the delayed 2D image signal b or c is sent to the left image phase control circuit 14.

In the 2D/3D converter, the left eye image and the right eye image are produced to produce parallax by the field delay system, and both or one of the left eye image and the right eye image produced are subjected to phase shift, to change the positional relationship between the subject and the surface of the reference screen.

Figure 2:
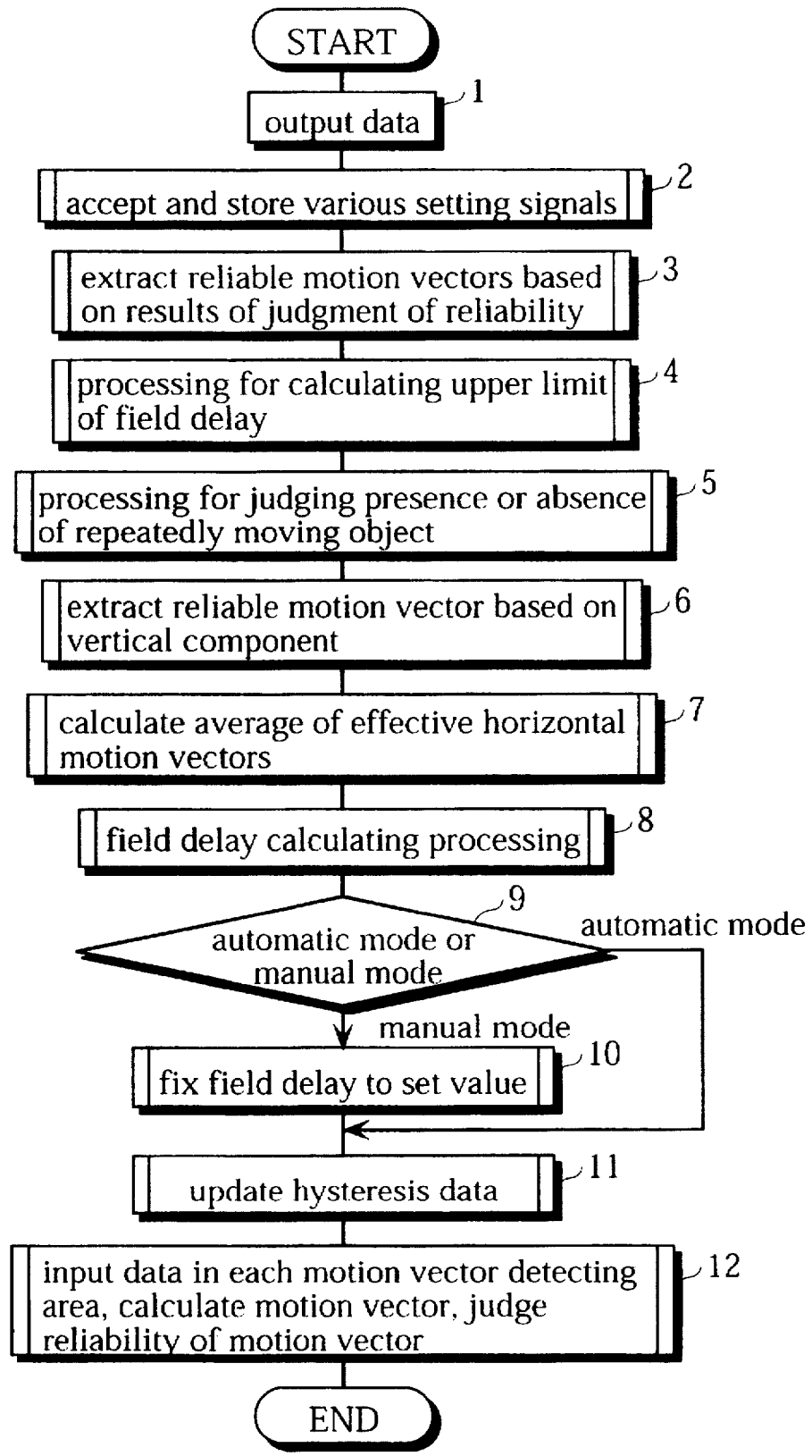
FIG. 2 is a flow chart showing the entire procedure for 2D/3D converting processing by a CPU.

FIG. 2 shows the procedure for 2D/3D converting processing by the CPU.

The 2D/3D converting processing by the CPU is performed for each timing of switching of the field corresponding to the input image signal a.

(1) In the step 1, data respectively representing a memory (a write memory) to which a 2D image signal is to be written and a memory (a read memory) from which a 2D image signal already stored is to be read out of the plurality of field memories 11 are outputted to the memory control circuit 24. Data representing the amount and the direction of phase shift by each of the phase control circuits 14 and 15 is outputted to the memory control circuit 24. Further, an image switching control signal is outputted to the image switching circuit 13.

The read memory is determined on the basis of a field delay determined in the previous 2D/3D converting processing. The amount and the direction of phase shift by each of the phase control circuits 14 and 15 are determined on the basis of data which have already been accepted and stored in the step 2 in the 2D/3D converting processing. The selection of one of the delayed 2D image signals b and c is determined on the basis of the type of field corresponding to the 2D image signal b to be read out from the field memory 11 and the type of field corresponding to the 2D image signal a. Further, the switching between the selected signal b or c and the signal a is determined on the basis of the direction of a horizontal motion vector which is found by the previous 2D/3D converting processing. The direction of the switching between the selected signal 1 or c and the signal a is represented by the plus or minus sign of a field delay.

(2) In the step 2, various input signals from the operating and displaying unit 23 are accepted and stored. Examples of the various input signals include a signal for setting the amount and the direction of phase shift, an automatic/manual mode setting signal indicating which of the automatic mode and the manual mode is set to calculate a field delay, a field delay scale factor setting signal set in a case where the automatic mode is set, and a field delay setting signal set in a case where the manual mode is set.

(3) In the step 3, only reliable motion vectors are extracted on the basis of the results of judgment of reliability with respect to a motion vector for each motion vector detecting area which is found in the step 10 in the previous 2D/3D converting processing.

(4) In the step 4, processing for calculating the upper limit of a field delay is performed on the basis of vertical components of the reliable motion vectors extracted in the step 3. The processing for calculating the upper limit of a field delay is processing for calculating the upper limit of a field delay in order to prevent the vertical distance of an object vertically moving from being too large between a left eye image and a right eye image. The details of the processing for calculating the upper limit of a field delay will be described larger.

(5) In the step 5, it is judged whether or not a repeatedly moving object is included in an image on the basis of a motion vector detected by each motion vector detecting area. When it is judged that the repeatedly moving object is included in the image, the field delay is so limited as to be decreased, as described later.

(6) In the step 6, only motion vectors whose vertical components are smaller than a predetermined value out of the reliable motion vectors extracted in the step 3 are extracted.

(7) In the step 7, an average value of the horizontal components of the reliable motion vectors (effective horizontal motion vectors) extracted in the step 6 is calculated.

(8) In the step 8, field delay calculating processing based on the average value of the effective horizontal lotion vectors calculated in the step 7 is performed. The details of the field delay calculating processing will be described later.

(9) In the step 9, it is judged which of the automatic mode and the manual mode is set on the basis of the data accepted and stored in the step 2.

(10) When it is judged in the step 9 that the manual mode is set, the field delay is fixed to the set value accepted in the step 2 (step 10).

(11) It is judged in the step 9 that the automatic mode is set, hysteresis data used in the field delay calculating processing in the step 8 is updated (step 11).

(12) In the step 12, data required to detect motion vectors is accepted from the motion vector detecting circuit 16, and a motion vector corresponding to each motion vector detecting area is calculated. In addition, the reliability of the motion vector is judged for each motion vector detecting area on the basis of the average value, the minimum value, and the like of accumulated correlation values for the motion vector detecting area. The calculated motion vectors and the results of the judgment of the reliability are stored in the RAM 22.

Figure 11:
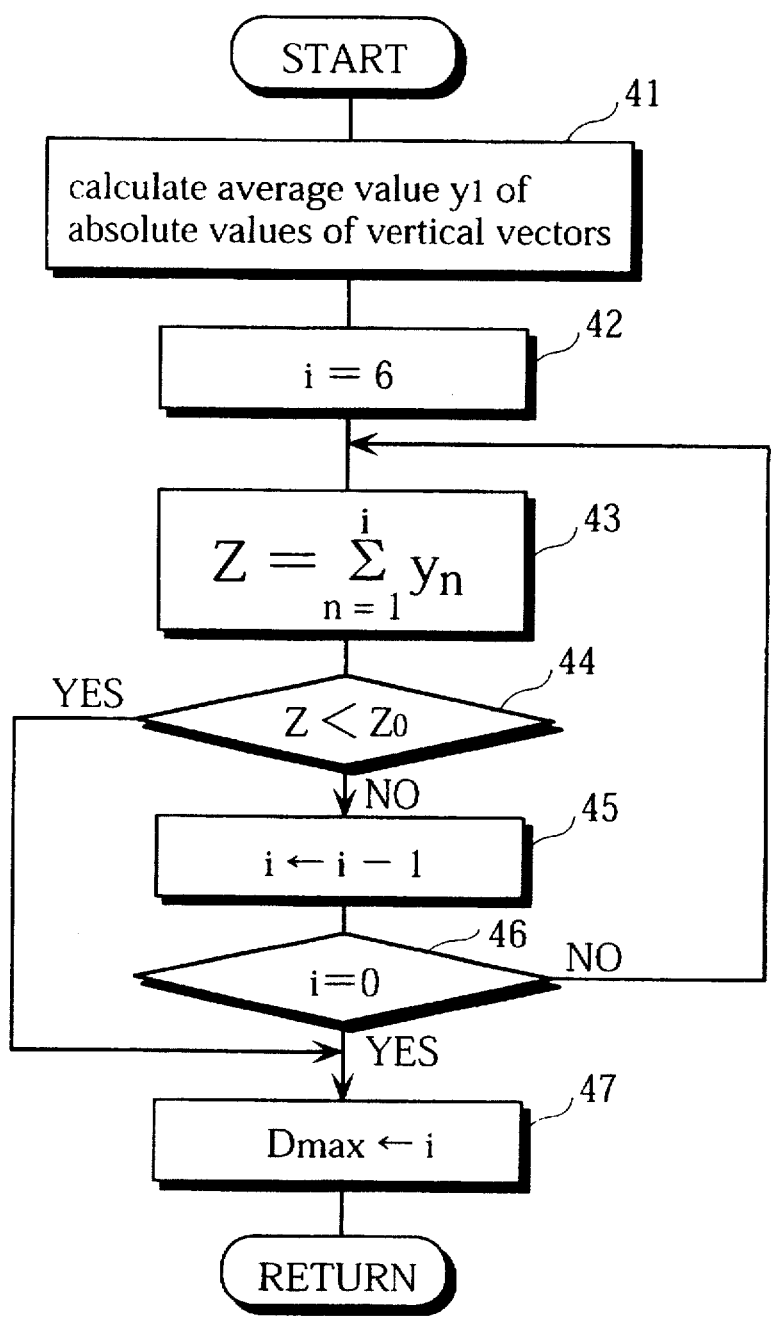
FIG. 11 is a flow chart showing the procedure for processing for calculating the upper limit of a field delay in the step 4 shown in FIG. 2.

FIG. 11 shows the detailed procedure for processing for calculating the upper limit of a field delay in the step 4 shown in FIG. 2. It is assumed that there are six field memories, and the maximum field delay (the maximum value of a field delay) is six.

An average value of absolute values of vertical components of reliable motion vectors (vertical vectors) extracted in the step 3 shown in FIG. 2 is calculated and is stored in the RAM 22 (step 41). An average value of absolute values of vertical vectors currently calculated is taken as $y_1$, and average values of absolute values of vertical vectors found five times in the past which have already been stored in the RAM 22 are taken as $Y_2$, $y_3$, $y_4$, $y_5$ and $Y_6$.

The average values corresponding to the past six fields including the latest average value $y_1$ which are stored in the RAM 22 are represented by $y_n$ (n=1, 2, 3, 4, 5, 6). A variable indicating how many continuous fields correspond to average values including the latest average value which are to be accumulated out of the average values $y_n$ (n=1, 2, 3, 4, 5, 6) corresponding to the past six fields shall be represented by i.

The variable i is then set to six which is the maximum field delay (step 42).

Average values including the latest average value which correspond to continuous i fields out of the average values $y_n$ (n=1, 2, 3, 4, 5, 6) corresponding to the past six fields are accumulated (step 43). Specifically, the average values corresponding to the variable i currently set out of the average values $Y_n$ corresponding to the past six fields which are stored in the RAM 22 are read out in the order starting from the latest average value, and the sum of the average values is calculated. That is, the sum Z of the average values of the absolute values of the vertical vectors which correspond to the past i fields is found on the basis of the following equation (1):

$$Z = \sum_{n=1}^{i} y_n \quad (1)$$

When the program proceeds from the step 42 to the step 43, i=6, whereby the sum Z is given by the following equation:

$$Z = y_1 + y_2 + y_3 + y_4 + y_5 + y_6 \quad (2)$$

It is then judged whether or not the sum Z calculated in the step 43 is less than a predetermined reference value Zo (step 44). As the reference value Zo, two, for example, is set.

When the sum Z calculated in the step 43 is less than the predetermined reference value Zo (YES in step 44), it is judged that the vertical movement of an image is small in a period corresponding to the past i fields, whereby the upper limit $D_{max}$ of the field delay is set to the variable i currently set (step 47). If i=6, for example, the upper limit $D_{max}$ of the field delay is set to six.

When the sum Z calculated in the step 43 is not less than the predetermined reference value Zo (No in step 44), it is judged that the vertical movement of the image is large in the period corresponding to the past i fields. In other words, the vertical distance of an object vertically moving becomes large between a left eye image and a right eye image, whereby it is judged that the left eye image and the right eye image of the object vertically moving are not harmonized with each other.

In this case, i is decremented by one (i←i−1) (step 45). If updated i is not zero (No in step 46), the program is returned to the step 43, whereby the processing in the step 43 and the subsequent steps is performed again.

For example, when i which is not updated is six and updated i is five, the sum Z ($=y_1+y_2+y_3+y_4+y_5$) of the average values of the absolute values of the vertical vectors which correspond to the past five fields is calculated (step 43). When the calculated sum Z is less than the reference value Zo (YES in step 44), the upper limit $D_{max}$ of the field delay is set to five (step 47). If the calculated sum Z is not less than the reference value Zo, i is decremented by one (i←i−1) (step 45), after which the program is returned to the step 43, whereby the processing in the step 43 and the subsequent steps is performed again.

The upper limit $D_{max}$ of the field delay is thus determined. When i updated in the step 45 is zero (YES in step 46), the upper limit $D_{max}$ of the field delay is set to zero.

Figure 12:
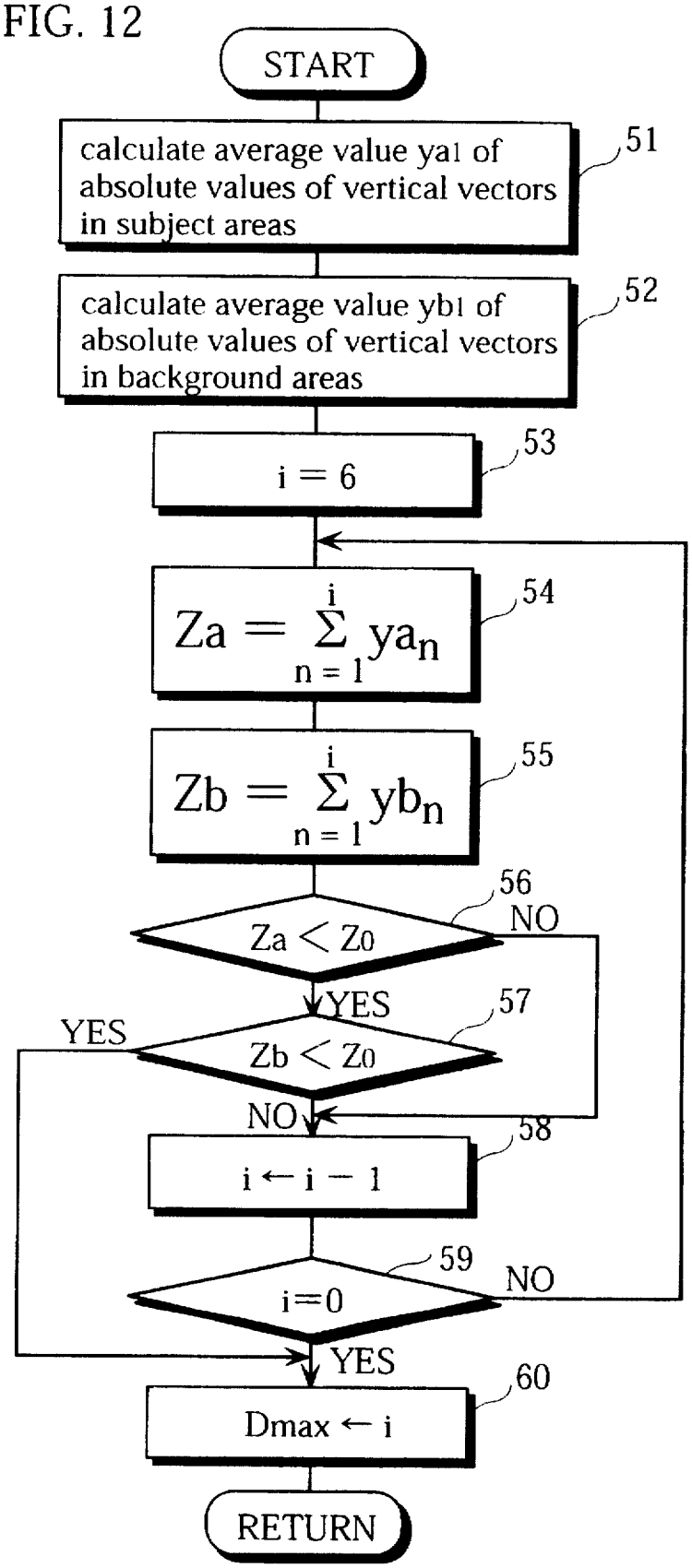
FIG. 12 is a flow chart showing another example of the processing for calculating the upper limit of a field delay.

FIG. 12 shows another example of the processing for calculating the upper limit of a field delay. It is assumed that there are six field memories, and the maximum field delay is six. In the step 12 shown in FIG. 2, subject areas and background areas out of motion vector detecting areas shall be distinguished.

An average value (hereinafter referred to as a first average value) of absolute values of vertical components of motion vectors in the subject areas out of the reliable motion vectors extracted in the step 3 shown in FIG. 2 is calculated and is stored in the RAM 22 (step 51). A first average value currently calculated is taken as $ya_1$, and first average values found five times in the past which have already been stored in the RAM 22 are taken as $ya_2$, $ya_3$, $ya_4$, $ya_5$ and $ya_6$.

The first average values corresponding to the past six fields including the latest first average value $ya_1$ which are stored in the RAM 22 are represented by $ya_n$ (n=1, 2, 3, 4, 5, 6). A variable indicating how many continuous fields correspond to average values including the latest average value which are to be accumulated out of the first average values $ya_n$ (n=1, 2, 3, 4, 5, 6) corresponding to the past six fields shall be represented by i.

An average value (hereinafter referred to as a second average value) of absolute values of vertical components of motion vectors in the background areas out of the reliable motion vectors extracted in the step 3 shown in FIG. 2 is calculated and is stored in the RAM 22 (step 52). A second average value currently calculated is taken as $yb_1$, and second average values found five times in the past which have already been stored in the RAM 22 are taken as $yb_2$, $yb_3$, $yb_4$, $yb_5$ and $yb_6$.

The second average values corresponding to the past six fields including the latest second average value $yb_1$ which are stored in the RAM 22 are represented by $yb_n$ (n=1, 2, 3, 4, 5, 6). A variable indicating how many continuous fields correspond to average values including the latest average value which are to be accumulated out of the second average values $yb_n$ (n=1, 2, 3, 4, 5, 6) corresponding to the past six fields shall be represented by i.

The variable i is then set to six which is the maximum field delay (step 53).

Average values including the latest average value which correspond to continuous i fields out of the first average values $ya_n$ (n=1, 2, 3, 4, 5, 6) corresponding to the past six fields are accumulated (step 54). Specifically, the sum Za (hereinafter referred to as the first sum Za) of the first average values $ya_n$ which correspond to the past i fields is found on the basis of the following equation (3):

$$Za = \sum_{n=1}^{i} ya_n \quad (3)$$

When the program proceeds from the step 53 to the step 54, i=6, whereby the first sum Za is given by the following equation (4):

$$Za = ya_1 + ya_2 + ya_3 + ya_4 + ya_5 + ya_6 \quad (4)$$

Average values including the latest average value which correspond to continuous i fields out of the second average values $yb_n$ (n=1, 2, 3, 4, 5, 6) corresponding to the past six fields are accumulated (step 55). Specifically, the sum Zb (hereinafter referred to as the second sum Zb) of the second average values $yb_n$ which correspond to the past i fields is found on the basis of the following equation (5):

$$Zb = \sum_{n=1}^{i} yb_n \quad (5)$$

When the program proceeds from the step 53 to the step 54 and the step 55, i=6, whereby the second sum Zb is given by the following equation (6):

$$Zb = yb_1 + yb_2 + yb_3 + yb_4 + yb_5 + yb_6 \quad (6)$$

It is then judged whether or not the first sum Za calculated in the step 54 is less than a predetermined reference value Zo (step 56). As the reference value Zo, two, for example, is set.

When the first sum Za calculated in the step 54 is less than the predetermined reference value Zo (YES in step 56), it is judged whether or not the second sum Zb calculated in the step 55 is less than the predetermined reference value Zo (step 57). As the reference value Zo, two, for example, is set.

When the second sum Zb calculated in the step 55 is less than the predetermined reference value Zo (YES in step 57), it is judged that the vertical movements of both a subject and a background are small in a period corresponding to the past i fields, whereby the upper limit $D_{max}$ of the field delay is set to i (step 60). If i=6, for example, the upper limit $D_{max}$ of the field delay is set to six.

When the answer is in the negative in either one of the foregoing steps 56 and 57, that is, the first sum Za is not less than the reference value Zo or the second sum Zb is not less than the reference value Zo, it is judged that the vertical movement of at least one of the subject and the background is large in the period corresponding to the past i fields. In this case, i is decremented by one (i←i−1) (step 58). If updated i is not zero (No in step 59), the program is returned to the step 54, whereby the processing in the step 54 and the subsequent steps is performed again.

For example, when i which is not updated is six and updated i is five, the first sum Za ($=ya_1+ya_2+ya_3+ya_4+ya_5$) of the first average values $ya_n$ which correspond to the past five fields is calculated (step 54). Further, the second sum Zb ($=yb_1+yb_2+yb_3+yb_4+yb_5$) of the second average values $yb_n$ which correspond to the past five fields is calculated (step 55).

When both the calculated first and second sums Za and Zb are less than the reference value Zo (YES in steps 56 and 57), the upper limit $D_{max}$ of the field delay is set to five (step 40). If at least one of the calculated first and second sums Za and Zb is not less than the reference value Zo, i is decremented by one (i←i−1), after which the program is returned to the step 54, whereby the processing in the step 54 and the subsequent steps is performed again.

The upper limit $D_{max}$ of the field delay is thus determined. When i updated in the step 58 is zero (YES in step 59), the upper limit $D_{max}$ of the field delay is set to zero.

Figure 13:
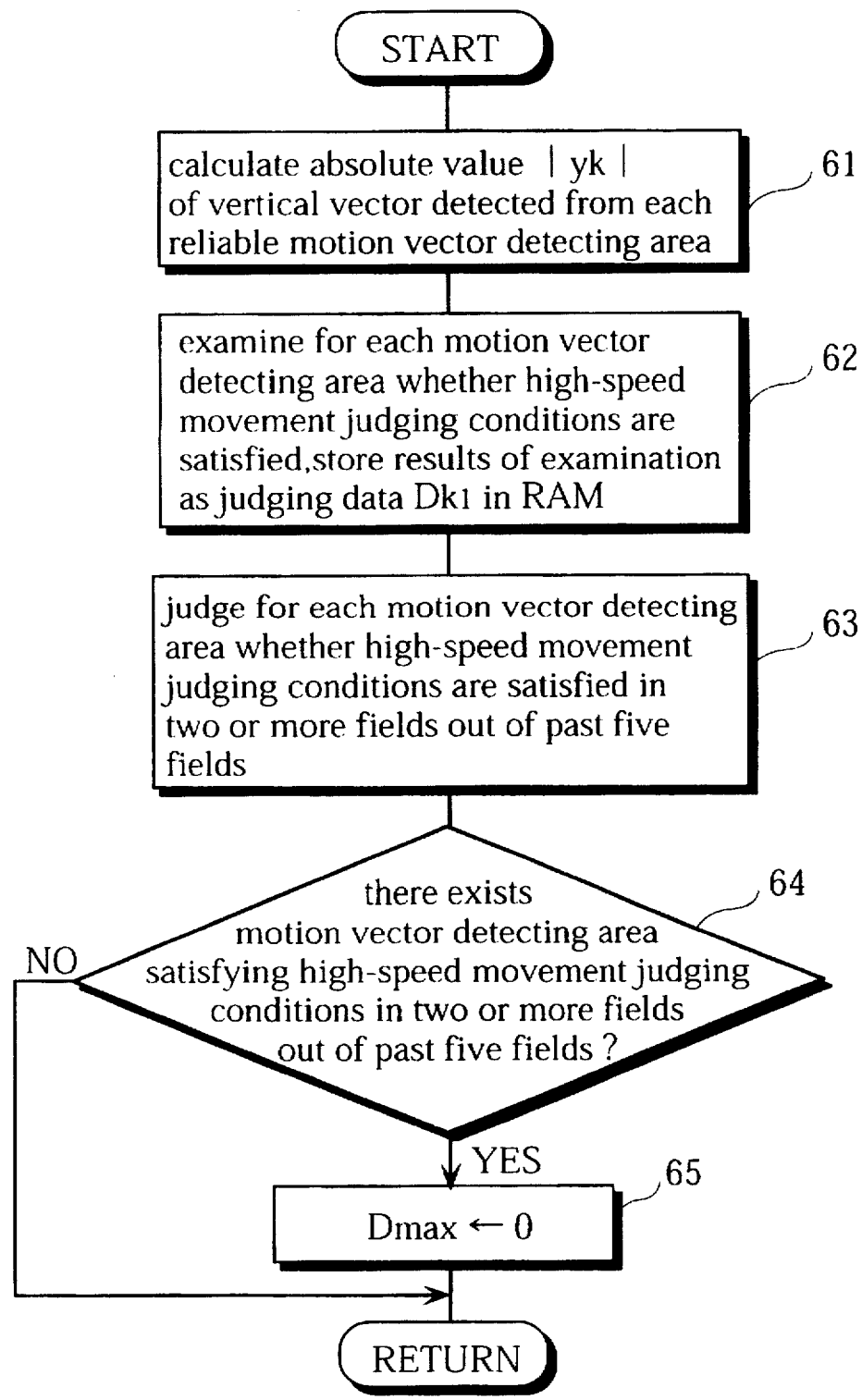
FIG. 13 is a flow chart showing still another example of the processing for calculating the upper limit of a field delay.

FIG. 13 shows another example of the processing for calculating the upper limit of a field delay. It is assumed that there are six field memories, and the maximum field delay is six.

A motion vector detecting area where a reliable motion vector is extracted in the step 3 shown in FIG. 2 out of all motion vector detecting areas $e_1$ to $e_m$ shall be referred to as a reliable motion vector detecting area. Absolute values $|y_k|$ (where k is a numeral in the range of 1 to m, which represents a motion vector detecting area) of vertical components of motion vectors (hereinafter referred to as vertical vectors) extracted in reliable motion vector detecting areas are respectively calculated and are stored in the RAM 22 (step 61). Absolute values $|y_k|$ of vertical vectors calculated over at least the past five fields are held in the RAM 22.

It is then examined for each reliable motion vector detecting area whether or not conditions for judging whether or not an object vertically moving at high speed exists (hereinafter referred to as high-speed movement judging conditions) are satisfied, and the results of the examination are stored in the RAM 22 (step 62). Specifically, it is judged whether or not the absolute value $|y_k|$ of the vertical vector calculated for each reliable motion vector detecting area is more than a predetermined value, for example, "5" (the number of pixels). When the calculated absolute value $|y_k|$ of the vertical vector is more than the predetermined value, it is judged that the motion vector detecting area k satisfies the high-speed movement judging conditions.

The results of the examination obtained for each reliable motion vector detecting area k are stored in the RAM 22 in relation to the motion vector detecting area k as data for judging whether or not an object-vertically moving at high speed exists (hereinafter referred to as judging data).

Judging data for each motion vector detecting area k currently calculated is taken as $W_{k1}$ (where k is a numeral in the range of 1 to m, which represents a motion vector detecting area). Judging data found four times in the past which have already been stored in the RAM 22 are taken as $W_{k2}$, $W_{k3}$, $W_{k4}$ and $W_{k5}$. The judging data corresponding to the past five fields including the latest judging data $W_{k1}$ which are stored in the RAM 22 are hereinafter represented by $W_{kn}$ (n=1, 2, 3, 4, 5).

It is then judged whether or not an object vertically moving at high speed exists in images in the past five fields on the basis of the judging data $W_{kn}$ corresponding to the past five fields. That is, it is judged whether or not the high-speed movement judging conditions are satisfied in not less than a predetermined number of fields out of the past five fields with respect to each of the motion vector detecting areas k (step 63). As the predetermined number of fields, two, for example, is set.

If there exists a motion vector detecting area k satisfying the high-speed movement judging conditions in not less than the predetermined number of fields out of the past five fields, it is judged that it is highly possible that an object vertically moving at high speed exists in the area. When there exists even one motion vector detecting area satisfying the high-speed movement judging conditions in not less than the predetermined number of fields out of the past five fields out of the motion vector detecting areas k (YES in step 64), therefore, it is judged that an object vertically moving at high speed exists in the images in the past five fields.

When there exists no motion vector detecting area satisfying the high-speed movement judging conditions in two or more fields out of the past five fields (NO in step 64), it is judged that no object vertically moving at high speed exists in the images in the past five fields.

When it is judged that the object vertically moving at high speed exists in the images in the past five fields (YES in step 64), the upper limit $D_{max}$ of the field delay is set to zero (step 65). The current processing is terminated.

When it is judged that there exists no object vertically moving at high speed in the images in the past five fields (NO in step 64), the current processing is terminated without setting the upper limit $D_{max}$ of the field delay.

Figure 14:
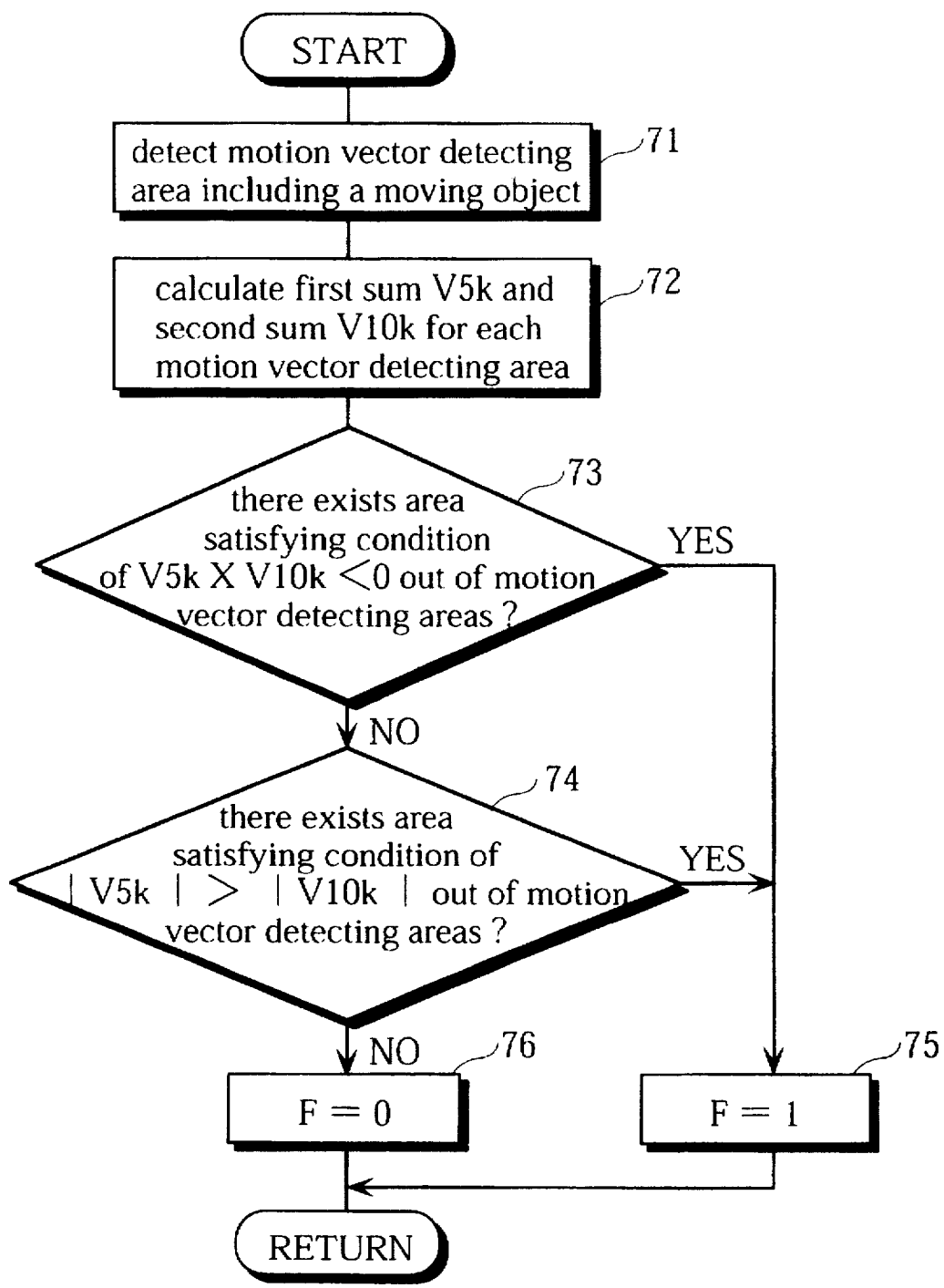
FIG. 14 is a flow chart showing the procedure for processing for judging the presence or absence of a repeatedly moving object.

FIG. 14 shows the detailed procedure for the processing for judging the presence or absence of a repeatedly moving object in the step 5 shown in FIG. 2.

An area including a moving object out of the motion vector detecting areas $e_1$ to $e_m$ is detected (step 71). Specifically, the product $U_k$ (k is 1 to m, which represents a motion vector detecting area) of the accumulated correlation values accepted in the step 12 which corresponds to the past ten fields is calculated for each motion vector detecting area $e_k$ (k=1 to m). An average value *U of the products $U_k$ corresponding to all the reliable motion vector detecting areas is calculated.

It is judged whether or not the following two conditions are simultaneously satisfied for each motion vector detecting area $e_k$.

$U_k>1.5\times(*U)$    condition 1

$|U_k|>\alpha$    condition 2

$|U_k|$ is an absolute value of the product $U_k$. $\alpha$ represents a defined value, which is set to 1000 in this example.

When both the conditions 1 and 2 are satisfied, it is judged that the motion vector detecting area is an area including a moving object.

For each motion vector detecting area which is judged to be an area including a moving object, the sum $V5_k$ of motion vectors corresponding to the past five fields and the sum $V10_k$ of motion vectors corresponding to the past ten fields are then calculated (step 72).

It is then judged whether or not there exists an area where the product of the sum $V5_k$ and the sum $V10_k$ ($V5_k \times V10_k$) is less than zero out of the motion vector detecting areas which are judged to be areas including a moving object (step 73). That is, it is judged whether or not there exists a motion vector detecting area satisfying the following condition 3 out of the motion vector detecting areas which are judged to be areas including a moving object:

$V5_k \times V10_k<0$    condition 3

When there exists a motion vector detecting area satisfying the condition 3 (YES in step 73), it is judged that a repeatedly moving object is included in the motion vector detecting area, whereby a repeatedly moving object detection flag F is set (F=1) (step 75). The reason for this is conceivably that in a case where a repeatedly moving object is included in the motion vector detecting area, the direction of the movement of the object is reversed during the past ten fields, whereby the plus or minus signs of the sum $V5_k$ of the motion vectors corresponding to the past five fields and the sum $V10_k$ of the motion vectors corresponding to the past ten fields are opposite to each other.

When there exists no motion vector detecting area satisfying the condition 3 (NO in step 73), it is judged whether or not there exists an area where an absolute value $|V5_k|$ of the sum $V5_k$ is more than an absolute value $|V10_k|$ of the sum $V10_k$ out of the motion vector detecting areas which are judged to be areas including a moving object (step 74). That is, it is judged whether or not there exists a motion vector detecting area satisfying the following condition 4 out of the motion vector detecting areas which are judged to be areas including a moving object:

$|V5_k|>|V10_k|$    condition 4

When there exists a motion vector detecting area satisfying the condition 4 (YES in step 74), it is judged that a repeatedly moving object is included in the motion vector detecting area, whereby the repeatedly moving object detection flag F is set (F=1) (step 75). The reason for this is conceivably that in a case where a repeatedly moving object is included in the motion vector detecting area, the direction of the movement of the object is reversed during the past ten fields, whereby the absolute value $|V10_k|$ of the sum $V10_k$ of the motion vectors for a long time period is less than the absolute value $|V5_k|$ of the sum $V5_k$ of the motion vectors for a short time period.

When there exists no motion vector detecting area satisfying the condition 3 or 4 (No in step 74), it is judged that there exists no repeatedly moving object, whereby the repeatedly moving object detection flag F is reset (F=0) (step 76).

Figure 3:
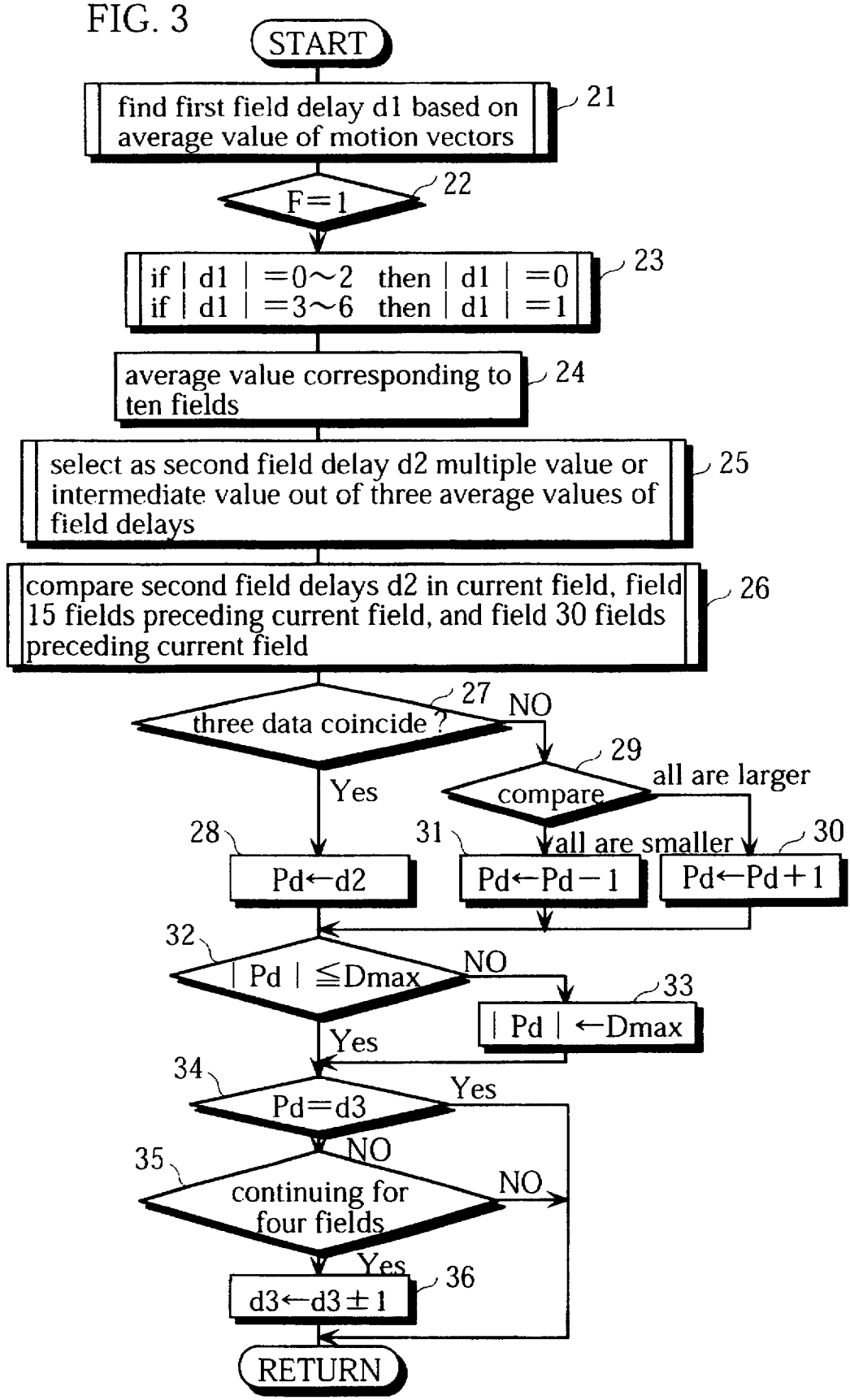
FIG. 3 is a flow chart showing the detailed procedure for field delay calculating processing in the step 7 shown in FIG. 2.

FIG. 3 shows the detailed procedure for the field delay calculating processing in the step 8 shown in FIG. 2.

A first field delay d1 is first found on the basis of the value of the field delay scale factor setting signal which is set and stored in the foregoing step 2 and the average value v of the effective horizontal motion vectors (hereinafter referred to as the average value of the motion vectors) which is found in the foregoing step 6 (step 21). In this example, an absolute value |d1| of the first field delay d1 is an integer between 0 to 6. That is, the first field delay satisfies $0 \leq |d1| \leq 6$.

Figure 4:
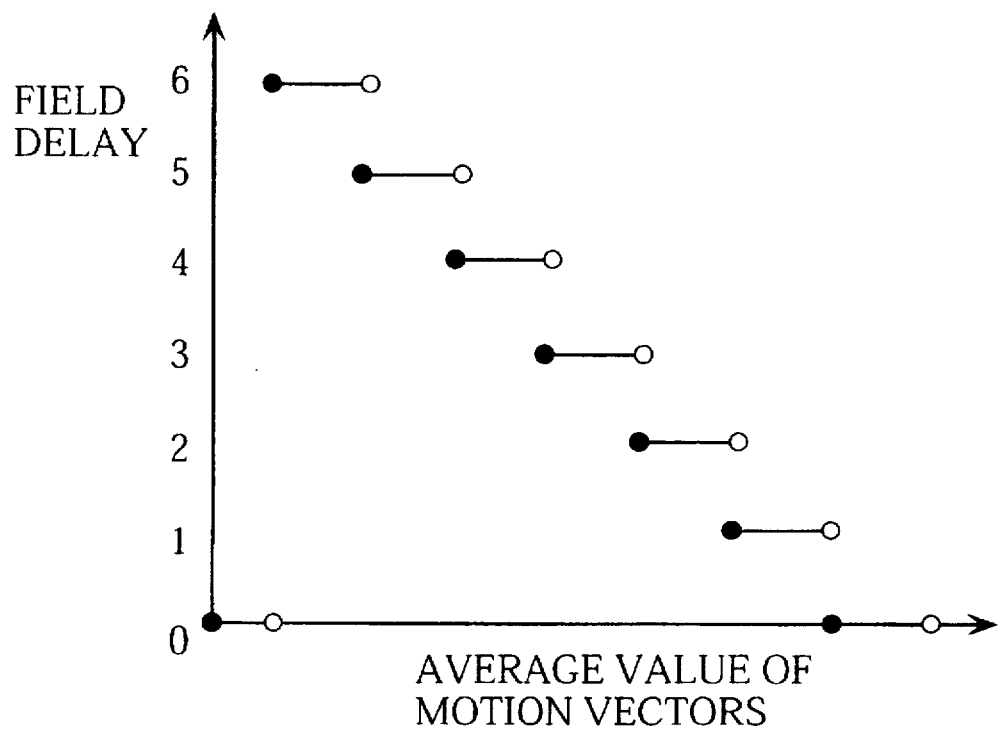
FIG. 4 is a graph showing the relationship between an average value of motion vectors and a first field delay.

FIG. 4 shows the relationship between an average value of motion vectors and a field delay. The relationship as shown in FIG. 4 is stored as a field delay table in the ROM 21. A field delay corresponding to an average value of motion vectors is found from the field delay table.

Parallax differs depending on the conditions of a 3D display device (a monitor), that is, the type of monitor and the conditions under which the monitor is seen even if the same 3D image signal is used. Therefore, the field delay found from the field delay table is multiplexed by the value of the field delay scale factor setting signal which is set and stored in the foregoing step 2 so as to obtain a similar 3D effect or conform to the taste of a viewer irrespective of the conditions of the monitor, thereby to find a first field delay d1.

A plurality of types of field delay tables may be stored so as to obtain the same 3D effect irrespective of the conditions of the monitor, and an instruction to select a field delay table corresponding to the conditions of the monitor or the taste of the viewer may be entered from the operating and displaying unit 23.

Figure 5:
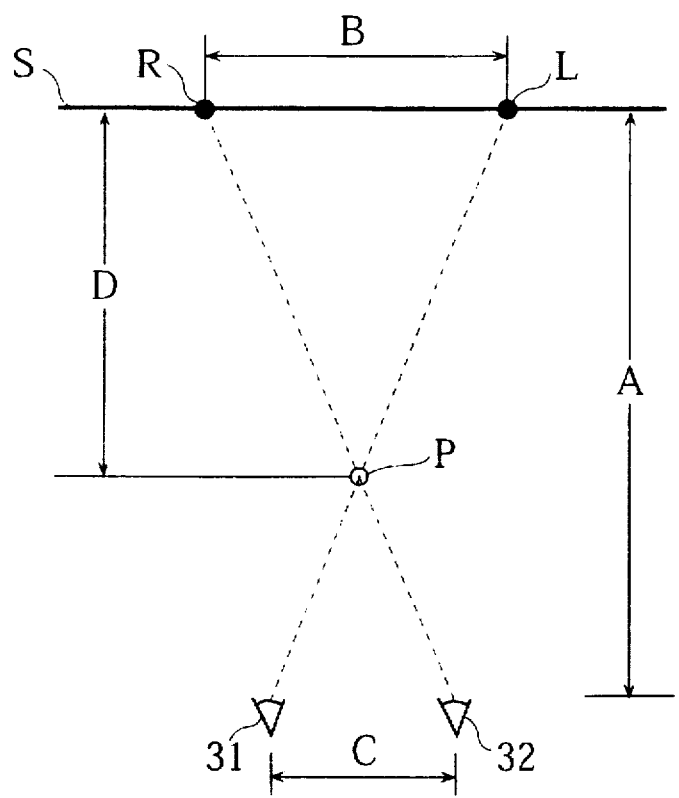
FIG. 5 is a typical diagram for explaining a method of deriving a relational expression for finding a first field delay from an average value of motion vectors.

Furthermore, the first field delay may be found on the basis of not the field delay table but a predetermined relational expression. A method of finding the relational expression in this case will be described with reference to FIG. 5.

The suitable spacing between a monitor surface S and the eyes 31 and 32 of the viewer is taken as a proper viewing distance A [mm]. The spacing between a right image R and a left image L of a viewed object on the monitor surface S is taken as parallax B [mm]. The distance between the eyes is taken as C [mm]. The proper viewing distance A is determined by the conditions of the monitor. The parallax B of the viewed object differs depending on the conditions of the monitor even if the same 3D image signal is used.

The position P of a 3D image of the viewed object is determined by the proper viewing distance A, the parallax B, and the distance between the eyes C. That is, an amount D [mm] by which the viewed object is raised forward against the monitor surface S is determined by the proper viewing distance A, the parallax B, and the distance between the eyes C.

The parallax B for setting the amount by which the viewed object is raised forward against the monitor surface S to a predetermined amount D is represented by the following equation (7) irrespective of the conditions of the monitor:

$$B = D \cdot C/(A-D) \quad (7)$$

Letting H [mm] be the horizontal length of the monitor, h [pixel] be the number of pixels in the horizontal direction of the monitor, v [pixel/field] be an average value of motion vectors, and d1 [field] be a first field delay, the following relationship (8) holds:

$$d1 \cdot v = (h/H) \cdot B \quad (8)$$

When an amount obtained by converting the parallax B into the number of pixels (=(h/H)·B) is set to an amount of adjustment X set by the operating and displaying unit 23 (data relating to the conditions of the monitor or data conforming to the taste of the viewer), the first field delay d1 is found by the following relational expression:

$$d1 = X/v \quad (9)$$

When the first field delay d1 is found in the step 21, it is judged whether or not the repeatedly moving object detection flag F (see the steps 75 and 76 in FIG. 14) is set (F=1) (step 22).

When the repeatedly moving object detection flag F is set (F=1), the absolute value |d1| of the first field delay d1 calculated in the step 21 is changed as follows (step 23).

Specifically, if the absolute value |d1| of the first field delay d1 calculated in the step 21 is 0, 1 or 2 ($0 \leq |d1| \geq 2$), then the absolute value |d1| of the first field delay d1 is changed into zero. If the absolute value |d1| of the first field delay d1 calculated in the step 21 is 3, 4, 5 or 6 ($3 \leq |d1| \leq 6$), then the absolute value |d1| of the first field delay d1 is changed into one. The program then proceeds to the step 24. When a repeatedly moving object is locally included in an image, the first field delay is so limited as to be decreased, whereby the repeatedly moving object is prevented from appearing as a double image.

When the repeatedly moving object detection flag F is not set (F=0), the program proceeds to the step 24 without performing the processing in the step 23.

In the step 24, an average value of first field delays corresponding to ten fields from the current field to a field which is nine fields preceding the field, an average value of first field delays corresponding to ten fields from a field which is one field preceding the current field to a field which is nine fields preceding the field, and an average value of first field delays corresponding to ten fields from a field which is two fields preceding the current field to a field which is nine fields preceding the field are respectively calculated on the basis of first field delay hysteresis data (step 25).

If two or more of the three average values are the same, the value (a multiple value) is then selected as a second field delay d2. If all the average values differ, an intermediate value is selected as a second field delay d2 (step 25).

The second field delay d2 selected in the step 25, a second field delay d2 in one of fields which are 12 to 18 fields preceding the current field (for example, a second field delay d2 in a field which is 15 fields preceding the current field), and a second field delay d2 in a field which is 30 fields preceding the current field are then compared with each other (step 26). Field delay hysteresis data used in the step 26 is the second field delay d2 obtained in the step 23 in the past.

When all the second field delays d2 coincide (YES in step 27), a target field delay Pd is changed into the second field delay selected in the step 25 (Pd=d2) (step 28), after which the program proceeds to the step 32. When the three second field delays d2 (which are represented by d2–1, d2–2 and d2–3 in the order from the past) are changed, and all the second field delays d2 coincide, the target field delay Pd is changed into the second field delay (d2–3), as shown in FIG. 6.

When all the second field delays d2 do not coincide (NO in the step 27), it is judged whether all the second field delays d2 are larger than the current target field delay Pd, are smaller than the current target field delay Pd, or are neither larger nor smaller than the current target field delay Pd (step 29).

When all the second field delays d2 are larger than the current target field delay Pd, one is added to the target field delay Pd (Pd=Pd+1) (step 30), after which the program proceeds to the step 32. For example, when the three second field delays d2 (which are represented by d2–1, d2–2 and d2–3 in the order from the past) are changed, and all the second field delays d2 are larger than the current target field delay Pd, one is added to the target field delay Pd, as shown in FIG. 7.

When all the second field delays d2 are smaller than the current target field delay Pd, one is subtracted from the target field delay Pd (Pd=Pd–1) (step 31), after which the program proceeds to the step 32. When all the second field delays d2 are neither larger nor smaller than the current target field delay Pd, the program proceeds to the step 32 without changing the current target field delay Pd.

In the step 32, it is judged whether or not an absolute value |Pd| of the target field delay Pd is not more than the upper limit $D_{max}$ of the field delay found in the processing for calculating the upper limit of a field delay (step 4 in FIG. 2). When the absolute value |Pd| of the target field delay Pd is not more than the upper limit $D_{max}$ of the field delay ($|Pd| \leq D_{max}$), the program proceeds to the step 34.

When the absolute value |Pd| of the target field delay Pd is more than the upper limit $D_{max}$ of the field delay ($|Pd| > D_{max}$), the absolute value |Pd| of the target field delay Pd is replaced with $D_{max}$ (step 33), after which the program proceeds to the step 34. Consequently, it is possible to avoid the possibility that a left eye image and a right eye image of an object vertically moving are not harmonized with each other.

It is judged in the step 34 whether or not the target field delay Pd and a field delay actually currently set (a set field delay d3) coincide with each other. When the target field delay Pd and the set field delay d3 do not coincide with each other, it is judged whether or not the set field delay d3 has already been continuing for four fields (step 35). When the set field delay d3 has already been continuing for four fields, the set field delay d3 is changed by one in the direction in which it approaches the target field delay Pd (d3=d3±1) (step 36). The program then proceeds to the step 9 shown in FIG. 2.

When it is judged in the foregoing step 34 that the target field delay Pd and the set field delay d3 coincide with each other (YES in step 34), or when it is judged in the foregoing step 35 that the set field delay d3 has not been continuing for four fields (NO in step 35), the program proceeds to the step 9 shown in FIG. 2 without changing the field delay.

Specifically, in this example, the set field delay d3 is so controlled that it approaches the target field delay Pd in units of four fields and one field at a time.

When the first field delay d1 is first calculated in the step 21 after the power supply is turned on, the second field delay d2, the target field delay Pd, and the set field delay d3 become equal to d1.

In the processing shown in FIG. 3, only the average value of the field delays corresponding to the ten fields from the current field to a field which is nine fields preceding the current field may be calculated and taken as the target field delay in the step 24, to omit the processing in the steps 25, 26, 27, 28, 29, 30 and 31.

Furthermore, only the average value of the field delays corresponding to the ten fields from the current field to a field which is nine fields preceding the current field may be calculated and taken as the second field delay in the step 24, to omit the processing in the step 25.

Additionally, the second field delay found in the step 25 may be taken as the target field delay, to omit the processing in the steps 26, 27, 28, 29, 30 and 31.

The processing in the steps 24 and 25 may be omitted. In this case, the first field delay d1 found in the steps 21 to 23 is used as the second field delay used in the step 26.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images, a main image signal and a sub-image signal delayed from the main image signal being produced from a two-dimensional image signal, and a field delay indicating how many fields are there from a field corresponding to the main image signal to a field corresponding to the sub-image signal being changed depending on horizontal components of motion vectors detected from the main image signal, wherein the upper limit of the field delay is determined on the basis of vertical components of motion vectors detected from the main image signal, and the field delay is so determined that it is not more than the determined upper limit, wherein an increase in the vertical distance of an object moving vertically between the main image signal and the sub-image signal is avoided, said method further comprising a first step of calculating for each field an average value of absolute values of vertical components of all or parts of motion vectors respectively detected from a plurality of motion vector detecting areas set in an image area of the main image signal and storing the calculated average value in storing means, a second step of setting a variable indicating how many continuous fields correspond to average values including the latest average value which are to be accumulated out of average values corresponding to a predetermined number of past fields which are stored in the storing means to a predetermined maximum field delay, a third step of reading out the average values corresponding to the set variable out of the average values corresponding to the predetermined number of past fields which are stored in the storing means in the order starting from the latest average value and calculating the sum of the average values, a fourth step of determining the variable currently set as the upper limit of the field delay when the calculated sum is less than a predetermined reference value, and decrementing the variable currently set by one when the calculated sum is not less than the predetermined reference value, and a fifth step of repeatedly performing the processing in said third and fourth steps using, when the variable is updated in the fourth step, the updated variable.

2. The method according to claim 1, wherein an average value of absolute values of vertical components of all or parts of motion vectors respectively detected from a plurality of motion vector detecting areas set in an image area of the main image signal is calculated for each field and is stored, and the upper limit of the field delay is determined for each field within the range of the number of past fields corresponding to average values whose sum is less than a predetermined value.

3. The method according to claim 1, wherein said first step comprises the steps of respectively detecting for each field motion vectors from all or parts of a plurality of motion vector detecting areas set in an image area of the main image signal, and storing the detected motion vectors in storing means, accumulating for each motion vector detecting area the motion vectors detected in the motion vector detecting areas over a first predetermined number of past fields on the basis of the motion vectors corresponding to a predetermined number of past fields which are stored in the storing means, to calculate the first sum for each motion vector detecting area, accumulating for each motion vector detecting area the motion vectors detected in the motion vector detecting areas over a second predetermined number of past fields which is larger than the first predetermined number of past fields on the basis of the motion vectors corresponding to the predetermined number of past fields which are stored in the storing means, to calculate the second sum for each motion vector detecting area, and judging whether or not there exists a motion vector detecting area where the product of the first sum and the second sum is less than zero out of the motion vector detecting areas, and judging that a repeatedly moving object is included in the main image signal when there exists the motion vector detecting area where the product of the first sum and the second sum is less than zero.

4. The method according to claim 1, wherein said first step comprises the steps of
respectively detecting for each field motion vectors from all or parts of a plurality of motion vector detecting areas set in an image area of the main image signal, and storing the detected motion vectors in storing means, accumulating for each motion vector detecting area the motion vectors detected in the motion vector detecting areas over a first predetermined number of past fields on the basis of the motion vectors corresponding to a predetermined number of past fields which are stored in the storing means, to calculate the first sum for each motion vector detecting area, accumulating for each motion vector detecting area the motion vectors detected in the motion vector detecting areas over a second predetermined number of past fields which is larger than the first predetermined number of past fields on the basis of the motion vectors corresponding to the predetermined number of past fields which are stored in the storing means, to calculate the second sum for each motion vector detecting area, and judging whether or not there exists a motion vector detecting area where the absolute value of the first sum is more than the absolute value of the second sum out of the motion vector detecting areas, and judging that a repeatedly moving object is included in the main image signal when there exists the motion vector detecting area where the absolute value of the first sum is more than the absolute value of the second sum.

5. A method of converting two-dimensional images into three-dimensional images, a main image signal and a sub-image signal delayed from the main image signal being produced from a two-dimensional image signal, and a field delay indicating how many fields are there from a field corresponding to the main image signal to a field corresponding to the sub-image signal being changed depending on horizontal components of motion vectors detected from the main image signal, wherein the upper limit of the field delay is determined on the basis of vertical components of motion vectors detected from the main image signal, and the field delay is so determined that it is not more than the determined upper limit, wherein an increase in the vertical distance of an object moving vertically between the main image signal and the sub-image signal is avoided, said method further comprising a first step of calculating for each field an average value of absolute values of vertical components of all or parts of motion vectors respectively detected from areas which are judged to be areas where subjects exist out of a plurality of motion vector detecting areas set in an image area of the main image signal and storing the calculated average value as a first average value in storing means, a second step of calculating for each field an average value of absolute values of vertical components of all or parts of motion vectors respectively detected from areas which are judged to be areas where backgrounds exist out of the plurality of motion vector detecting areas and storing the calculated average value as a second average value in the storing means, a third step of setting a variable indicating how many continuous fields correspond to average values including the latest average value which are to be accumulated out of first average values and second average values corresponding to a predetermined number of past fields which are stored in the storing means to a predetermined maximum value of the field delay, a fourth step of reading out the first average values corresponding to the set variable out of the first average values corresponding to the predetermined number of past fields which are stored in the storing means in the order starting from the latest first average value and calculating the first sum which is the sum of the first average values, a fifth step of reading out the second average values corresponding to the set variable out of the second average values corresponding to the predetermined number of past fields which are stored in the storing means in the order starting from the latest second average value and calculating the second sum which is the sum of the second average values, a sixth step of determining the variable currently set as the upper limit of the field delay when both the first sum and the second sum calculated are less than a predetermined reference value, and decrementing the variable currently set by one when at least one of the first sum and the second sum calculated is not less than the predetermined reference value, and a seventh step of repeatedly performing the processing in the fourth, fifth and sixth steps using, when the variable is updated in the sixth step, the updated variable.

* * * * *